UNITED STATES PATENT OFFICE.

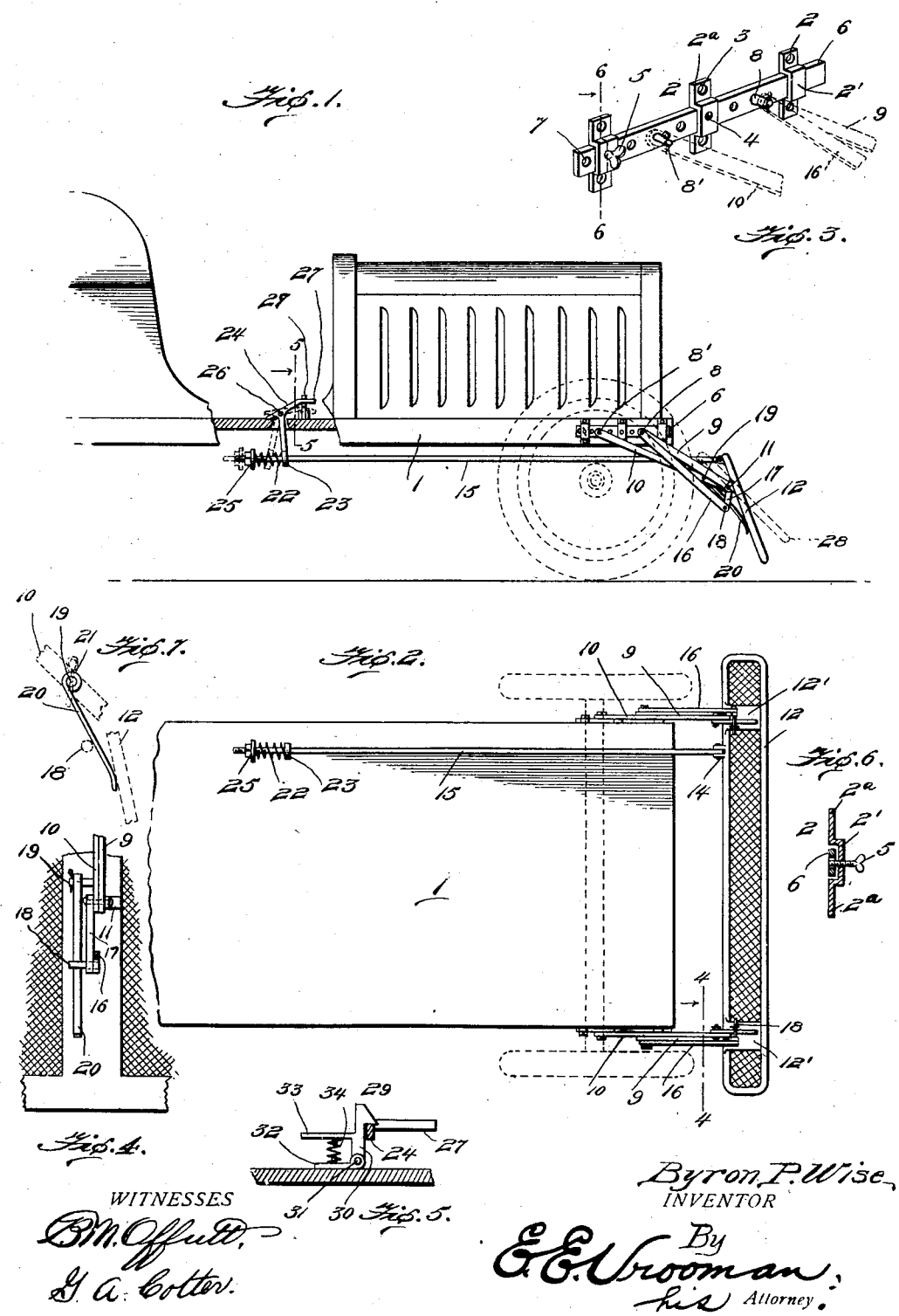

BYRON P. WISE, OF AKRON, OHIO.

FENDER FOR MOTOR-VEHICLES.

No. 861,624.  Specification of Letters Patent.  Patented July 30, 1907.

Application filed April 23, 1907. Serial No. 369,807.

*To all whom it may concern:*

Be it known that I, BYRON P. WISE, a citizen of the United States, residing at Akron, in the county of Summit and State of Ohio, have invented certain new and useful Improvements in Fenders for Motor-Vehicles, of which the following is a specification, reference being had therein to the accompanying drawing.

This invention relates to an improvement in fenders for motor vehicles, and in fact, may be attached to any kind of a vehicle.

The object of the invention is the improvement of the construction of a fender, which comprises a minimum number of parts, is simple in operation, and comparatively inexpensive to construct.

Another object of the invention is the provision of means carried by a vehicle for facilitating the removal of an object in the path of the vehicle when the same is traveling over the ground.

With these and other objects in view, the invention consists of certain novel constructions, combinations, and arrangements of parts, as will be hereinafter fully described and claimed.

In the drawings: Figure 1 is a view in side elevation of my improved fender or life guard, constructed in accordance with the present invention, showing the same applied to a motor vehicle. Fig. 2 is an inverted plan view of the fender or mechanism depicted in Fig. 1. Fig. 3 is a fragmentary, perspective view of my improved fender, showing particularly one of the horizontal, adjustable bars and the supports therefor. Fig. 4 is a fragmentary sectional view on line 4, 4, Fig. 2, and looking in the direction of the arrow. Fig. 5 is a fragmentary, sectional view of the fender taken on line 5, 5, Fig. 1, and looking in the direction of the arrow. Fig. 6 is a sectional view taken on line 6, 6, Fig. 3. Fig. 7 is a view, in side elevation, of one of the buffer-springs.

Referring to the drawings by numerals, 1 designates the body of the motor vehicle, which comprises a support carrying my improved fender or life guard.

My guard or fender-member is supported at the sides of the body by similarly constructed devices, and, therefore, it will only be necessary to specifically describe one of these devices.

Each attaching device for the guard comprises a plurality of brackets 2. Each bracket comprises a body 2′, provided with oppositely extending projections 2ª, which projections are provided with apertures 3, whereby suitable fastening means may be employed for attaching said brackets 2 to the body of the vehicle. Some of said brackets 2 are preferably provided upon their body 2′ with horizontal apertures 4, see particularly Fig. 3, and within one of the apertures 4, on each side of the body 1, is threaded a thumb-screw 5.

A horizontal bar 6 is secured upon the brackets 2, at each side of the body 1, and said bars 6 are longitudinally-adjustable upon said brackets 2, for the purpose hereinafter specified. Each bar 6 is provided, preferably, with horizontal apertures 7 and also, preferably, with horizontally extending studs 8 and 8′. After each bar 6 has been adjusted upon the brackets 2 to the desired position, so as to cause one of the apertures 7 to register with the aperture in the body 2′, carrying the thumb-screw 5, by threading the thumb-screw 5 inward upon the bracket 2, its inner-end will be positioned in the registering aperture of the bar, thereby locking the longitudinal-movable bar in an adjusted position.

A substantially V-shaped, inverted bracket is secured to each bar 6 and comprises an upper section 9 and a lower section 10. The upper end of the section or member 9 is mounted upon stud 8, and the upper end of the lower section 10 is mounted upon the stud 8′. The lower ends of the sections or members 9 and 10 are connected by means of a horizontal bolt 11.

A guard or fender-member 12, preferably rectangular in shape, is pivotally mounted upon the bolts 11. The guard 12 is provided, preferably, at its upper edge with a bifurcated portion 14, to which portion 14 is pivotally connected a horizontal rod or bar 15. Each attaching device is also provided with bracing rods or bars 16 secured at their upper ends to studs 8, carried by the bars 6, and their lower ends are connected to bolts 11 by means of links 17. The links 17 constitute a bearing plate against which the inner face 12′ of the frame of the guard 12 is adapted to bear when the lower end is suddenly thrown downward and rearward. It is to be noted that the pivot of the guard 12 is off-center and near the upper edge. The connection between the bracing bars 16 and connecting links 17, in both instances, is a bolt or stud 18, the inner end of which projects inwardly, see Figs. 2 and 4. A stud or bolt 19 is secured to each of the lower sections or members 10, near the guard 12. A buffer-spring 20 has a loop 21 at its upper end surrounding bolt 19, and its lower end bears against the frame of the guard 12. The spring 20 rests intermediate its ends upon bolt 18, and thereby provides a yielding support for the lower part of the guard 12, normally retaining the guard 12 in an inclined position, see Fig. 1.

By reason of the adjustable structure of the bar 6, constituting a support for the auxiliary brackets carrying the guard at the lower ends, my fender is adapted for vehicles provided with different size wheels, as it will be obvious that the guard or fender-member 12 can be adjusted near or away from the front end of the motor vehicle, as desired. Furthermore, it is to be noted that the adjustable supporting means or bars 6 also carry fixed buffer-links 17 whereby the strain or weight of a load striking the guard or fender-member 12 may be taken off of said guard and thrown upon the attaching devices, by reason of the fact that the inner ends of said guard 12 will press against the links 17, as before specified.

The guard 12 is provided with a yielding buffer for its lower portion, constituted by the springs 20, and said guard is also provided with an additional yielding buffer constituted by a spring 22 carried contiguous to the inner end of the rod 15 between the lower, apertured end 23 of the foot lever 24 and the washer and nut 25. The foot lever 24 is pivotally mounted upon the body of the vehicle, as at 26, and is provided with a tread 27. It will be obvious that by adjusting the nut on rod 15 inward, the tension on spring 22 may be increased, as said spring will be compressed between the foot lever and the washer, causing the lower end of the guard 12 to be thrown upward.

If the vehicle is passing over uneven ground, the operator can press downward upon the tread portion 27, causing the foot-lever to be swung upon its pivot 26, and thereby slightly compressing spring 22 and throwing up the lower end of the guard or fender member 12, as shown by dotted lines 28. If it is desired to retain the guard or fender-member in its elevated position, this can be accomplished by permitting catch 29 to hook over the foot-lever 24. The catch 29 comprises a body 30 pivotally mounted, at 31, upon a plate 32, see Fig. 5. The body 30 of the catch is provided with a horizontally-extending arm or foot-engaging extension 33, between which extension 33 and a plate 32 is positioned a coiled spring 34. The spring 34 is preferably secured between plate 32 and extension 33, by means of short studs, upon which the ends of the spring 34 are mounted.

It is to be noted that, if a load is thrown upon the guard or fender-member 12, below bolts 11, constituting the pivot therefor, owing to the yieldable connection between rod 15 and foot-lever 24, said connection will not be injured, as would likely be the case if the connection between said rod and foot-lever was rigid. However, the tension on the spring 22 is such as to form a sufficiently rigid connection so that a slight downward movement of the tread-portion of the foot lever will throw up the lower end of the guard or fender-member 12. It will, therefore, be obvious that I have provided a yieldable connection between the foot lever and the guard or fender-member 12. Furthermore, by reason of the threading of the nut upon the inner end of the rod 25, any adjustment of the bars 6 can be provided for, by threading the nut longitudinally of rod 15.

What I claim is:

1. In a fender, the combination with the body of a motor vehicle, of horizontal, adjustable members upon opposite sides of said motor vehicle, a guard, brackets pivotally connecting said guard to said adjustable members, lever means carried by said body, and yieldable means connecting said lever means to said guard.

2. In a fender, the combination with a support, of inverted, substantially V-shaped brackets adjustably secured to opposite sides of said support, a guard pivotally mounted upon the lower end of said brackets, and means for swinging said guard upon said brackets.

3. In a fender, the combination with a support provided with sides, of a plurality of brackets secured to each side of said support, an adjustable bar secured upon the brackets of each side, means carried by one of said brackets for securing said bar in an adjusted position, studs extending from each bar, a guard, and means connecting said guard to said studs.

4. In a fender, the combination with a support, of bars provided with horizontal studs, adjustably secured to said support, a guard, means connecting each end of said guard to the studs of each bar, a yieldable buffer supported by each bar and normally engaging said guard, and means for swinging said guard upon said connecting means.

5. In a fender, the combination with a support, of horizontal bars carried by said support, inclined brackets secured to said bars, inclined bracing bars carried by said first-mentioned bars, links connecting said inclined brackets and the lower end of said bracing bars, and a guard pivotally mounted upon said inclined brackets, said links constituting a buffer for said guard.

6. In a fender, the combination with a support, of brackets provided with lower sections, carried by said support, a guard pivotally mounted upon the lower ends of said brackets, links pivotally connected to said brackets, bolts extending inwardly from the inner face of said links, spring-buffers attached to the lower section of said brackets and engaging said bolts and bearing against said guard, and means for adjusting said guard upon said brackets.

7. In a fender, the combination with a support, of depending brackets carried by said support, a guard pivotally mounted upon said brackets, a link carried by one of said brackets, and a yieldable buffer secured near one end to said bracket provided with the link, and supported intermediate its ends by said link and bearing against said guard.

8. In a fender, the combination with a vehicle body and a guard, of attaching means for securing the ends of the guard to opposite sides of said body, each attaching means comprising a plurality of brackets, a horizontal bar slidably mounted in said brackets, means carried by one of said brackets for securing said bar in an adjusted position, a sectional, substantially inverted V-shaped bracket secured at its upper ends to said bar and pivotally connected at its lower end to said guard, a link connected at one end to the lower end of said bracket, a bracing bar connected at its upper end to said bar and at its lower end to the lower end of said link, a buffer-spring secured at its upper end to said bracket and supported intermediate its ends upon said link and having its lower end bearing against said guard, and means for swinging said guard upon said brackets.

9. In a fender, the combination with a support, a guard pivotally mounted upon said support, of a foot-lever pivotally mounted upon said support, said foot-lever provided with a depending apertured portion, a rod slidably mounted in the apertured portion of said foot-lever and pivotally connected at one end to said guard, a nut threaded upon the opposite end of said rod, and yieldable means interposed between said depending portion of the foot-lever and said nut.

10. In a fender, the combination with a support, a guard pivotally mounted upon said support, of a foot-lever pivotally mounted upon said support, yieldable connecting means for said foot-lever and guard, a latch for securing said foot-lever in an adjusted position, said latch comprising a plate, a body pivotally mounted upon said plate, said body provided with a catch and an outwardly-extending arm, and a spring interposed between said plate and arm.

11. In a fender, the combination with a vehicle body, of bars provided with studs, adjustably secured to said body, a guard, means movably connecting said guard to said studs, and means for swinging said guard upon said connecting means.

12. In a fender, the combination with a support, of brackets provided with outwardly-bulged body-portions, upon opposite sides of said support, bars slidably mounted within the body-portions of said brackets, manually-adjustable locking devices carried by the body-portions of said brackets and adapted to engage said bars for securing the same in an adjusted position, brackets depending from said bars, and a guard movably mounted upon said last-mentioned brackets below said bars.

13. In a fender, the combination with a support, of adjustable members positioned upon opposite sides of said support, locking devices for securing said members in an adjusted position, depending brackets secured to said members, a guard movably connected to said brackets near their lower ends, and lever means connected to said guard and being capable of moving the same upon said brackets.

14. In a fender, the combination with a support, of depending brackets positioned upon opposite sides of said support, means connecting said brackets to said support, a guard pivoted intermediate its upper and lower face upon said brackets, yielding means carried near the lower end of one of said brackets and slidably engaging said guard, and means connected to said guard for swinging the same upon said bracket.

15. In a fender, the combination with a support, of inverted substantially V-shaped brackets carried by said support, a guard pivotally mounted upon the lower portion of said brackets, a yieldable buffer carried by one of said brackets near its lower end and normally engaging said guard, and means for swinging said guard upon said brackets.

16. In a fender, the combination with a support, of depending brackets positioned upon opposite sides of said support and having their lower ends projecting beyond the front of said support, a guard pivotally mounted upon the lower ends of said brackets, means formed upon said brackets for limiting pivotal movement of said guard in one direction, a yieldable buffer carried by the lower end of said brackets, and means for swinging said guard upon said brackets.

17. In a fender, the combination with a support, of depending brackets secured to and projecting beyond the front end of said support, a fender pivotally mounted upon the lower ends of said brackets, means engaging said fender below said brackets and carried by said brackets and normally exerting an upward pressure upon the lower end of said fender, and means for manually swinging said fender upon said brackets.

18. In a fender, the combination with a support, of brackets carried by said support, a guard pivotally mounted intermediate its upper and lower edges on said brackets, a yielding buffer engaging said guard below its pivot upon the brackets, said buffer carried by the lower portion of said brackets, the buffer normally exerting an upward pressure upon the lower portion of said fender, and manually-operated means connected to the buffer above its pivot and being capable of swinging the fender.

In testimony whereof I hereunto affix my signature in presence of two witnesses.

BYRON P. WISE.

Witnesses:
G. W. AUTEN,
FLORENCE E. STRATTON.